US006806078B2

(12) United States Patent
Newman (10) Patent No.: US 6,806,078 B2
(45) Date of Patent: Oct. 19, 2004

(54) SUBSTRATE AND METHOD FOR ANAEROBIC REMEDIATION

(76) Inventor: William A. Newman, 6712 West River Rd., Brooklyn Center, MN (US) 55430

( * ) Notice: Subject to any disclaimer, the term of this patent is extended or adjusted under 35 U.S.C. 154(b) by 0 days.

(21) Appl. No.: 10/353,289

(22) Filed: Jan. 29, 2003

(65) Prior Publication Data

US 2004/0043474 A1 Mar. 4, 2004

Related U.S. Application Data

(60) Provisional application No. 60/406,283, filed on Aug. 27, 2002.

(51) Int. Cl.$^7$ .............................. C12N 1/00; C12N 1/20; B09B 3/00
(52) U.S. Cl. ...................... 435/262.5; 435/243; 435/822
(58) Field of Search .............................. 435/262.5, 243, 435/822

(56) References Cited

U.S. PATENT DOCUMENTS

| | | | | |
|---|---|---|---|---|
| 5,268,190 A | * | 12/1993 | Gerhard ...................... | 426/580 |
| 5,616,358 A | * | 4/1997 | Taylor et al. ............... | 426/590 |
| 5,634,983 A | * | 6/1997 | Kammeraad ................ | 134/25.1 |
| 5,814,514 A | * | 9/1998 | Steffan et al. ............... | 435/262 |
| 5,856,452 A | * | 1/1999 | Moloney et al. ............ | 530/412 |
| 6,056,806 A | * | 5/2000 | Youssef ....................... | 95/254 |
| 6,245,235 B1 | * | 6/2001 | Perriello ..................... | 210/611 |
| 6,398,960 B1 | * | 6/2002 | Borden et al. .............. | 210/610 |

\* cited by examiner

*Primary Examiner*—David Naff
*Assistant Examiner*—Deborah K. Ware
(74) *Attorney, Agent, or Firm*—Bernd W. Sandt (57) ABSTRACT

The present invention comprises a method for anaerobic remediation of contaminated soil and groundwater comprising (a) preparing an aqueous mixture of a sparingly soluble digestible fat or oil, (b) heating and homogenizing such mixture until a stable emulsion having a particle size below 1 micron is obtained, and (c) injecting such under anaerobic conditions into the contaminated soil. The heating is preferably conducted at pasteurization temperatures and the homogenization is preferably conducted in a food homogenizer. This invention also relates to the fine emulsions formed in the homogenization and pasteurization process and to the soil that has been treated by the inventive remediation method. The emulsion is preferably combined with a water soluble, rapidly biodegradable microbial food compound and can also be combined with microbes useful in the remediation process.

22 Claims, 3 Drawing Sheets

9.4% Substrate Injected - 4.3% Soybean Oil By Weight

MW-6

| Date Sampled | Elapsed Time Since Injection Days | 1,1,1 Trichlorethane ppb | Trichloroethene ppb | 1,1 Dichloroethene ppb | cis 1,2 Dichloroethene ppb | Vinyl Chloride ppb |
|---|---|---|---|---|---|---|
| 12/21/2002 | Preinjection | <2,500 | 64,000 | 3,400 | 4,100 | <2,500 |
| 3/29/2002 | 2 | <1,000 | 60,000 | 2,700 | 8,200 | <1,000 |
| 4/30/2002 | 34 | 430 | 13,000 | 1,700 | 17,000 | 6,200 |
| 5/24/2002 | 58 | 300 | 2,900 | 950 | 7,600 | 4,800 |
| 6/14/2002 | 72 | <250 | 4,000 | 1,000 | 11,000 | 8,900 |
| 7/23/2002 | 111 | <250 | 2,000 | 490 | 7,800 | 6,800 |
| 8/22/2002 | 141 | <250 | <250 | <250 | 3,400 | 7,300 |
| 9/18/2002 | 168 | <100 | <100 | <100 | 2,800 | 460 |
| 12/17/2002 | 258 | 54 | <50 | <50 | 1,400 | 3,200 |

MW-7

| Date | Elapsed Time Since Injection Days | 1,1,1 Trichlorethane ppb | Trichloroethene ppb | 1,1 Dichloroethene ppb | cis 1,2 Dichloroethene ppb | Vinyl Chloride ppb |
|---|---|---|---|---|---|---|
| 12/21/2002 | Preinjection | <25 | 200 | 58 | 920 | 670 |
| 3/29/2002 | 2 | <25 | 410 | 120 | 1,900 | 540 |
| 4/30/2002 | 34 | <10 | <10 | <10 | 470 | 650 |
| 5/24/2002 | 58 | <2.5 | <2.5 | <2.5 | 73 | 160 |
| 6/14/2002 | 72 | <2.5 | <2.5 | <2.5 | <2.5 | <2.5 |
| 7/23/2002 | 111 | <1 | <1 | <1 | 6 | 63 |
| 8/22/2002 | 141 | <1 | <1 | <1 | 4 | 36 |
| 9/18/2002 | 168 | <100 | <100 | <100 | 2,800 | 460 |
| 12/17/2002 | 258 | <1 | <1 | <1 | 7 | 8 |

MW-12

| Date | Elapsed Time Since Injection | 1,1,1 Trichlorethane ppb | Trichloroethene ppb | 1,1 Dichloroethene ppb | cis 1,2 Dichloroethene ppb | Vinyl Chloride ppb |
|---|---|---|---|---|---|---|
| 12/21/2002 | Preinjection | 16,000 | 29,000 | 4,100 | 2,000 | 250 |
| 3/29/2002 | 2 | 150000 | 250,000 | 45,000 | <2,500 | <2,500 |
| 4/30/2002 | 34 | 130,000 | 230,000 | 30,000 | 8,200 | <2,500 |
| 5/24/2002 | 58 | 90,000 | 100,000 | 15,000 | 15,000 | <5,000 |
| 6/14/2002 | 72 | 82,000 | 140,000 | 8,800 | 10,000 | <5,000 |
| 7/23/2002 | 111 | 34,000 | 35,000 | 11,000 | 16,000 | 3,400 |
| 8/22/2002 | 141 | 18,000 | 18,000 | 7,400 | 14,000 | 7,000 |
| 9/18/2002 | 168 | 20,000 | 27,000 | 5,900 | 17,000 | 4,100 |
| 12/17/2002 | 258 | 7,100 | 6,100 | 3,200 | 9,500 | 6,500 |

SUBSTRATE AND METHOD FOR ANAEROBIC REMEDIATION

FIELD OF INVENTION

This invention relates to the remediation of contaminated soil and groundwater and in particular to emulsified oil substrates and their use in such remediation. This application is a continuation-in-part of my application Ser. No. 60/406,283 filed Aug. 28, 2002.

BACKGROUND OF THE INVENTION

Ground water represents greater than 95% of the available fresh water in the United States including the Great Lakes (Faust and Aly, 1987). Contamination of ground water resources with persistent contaminants such as toxic metals, MTBE, and chlorinated solvents is a growing problem. Ground water use by public utilities tripled between 1950 and 1975 and from 3.5 bgd to 11 bgd and use continues to grow rapidly in recent years (Faust and Aly, 1987). Detection of organic contaminants such as chlorinated solvents in municipal supply wells is becoming more and more common. "Halogenated volatile organic compounds (VOCs), including chlorinated aliphatic hydrocarbons (CAHs) are the most frequently occurring type of contaminant in soil and ground water at Superfund and other hazardous waste sites in the United States. The U.S. Environmental Protection Agency (EPA) estimates that cleanup of these sites will cost more that $45 billion (1996 dollars) over the next several decades (EPA, 1997). Innovative technologies, including in situ bioremediation, are being developed and implemented in an effort to reduce the cost and time required to clean up those sites. In situ bioremediation is increasingly being selected to remediate hazardous waste sites because, when compared to above-ground technologies, it is usually less expensive, does not require waste extraction or excavation, and is more publicly acceptable as it relies on natural processes to treat contaminants." (EPA 542-R-00-008, July 2000).

Natural attenuation of chlorinated solvents by reductive dechlorination often occurs at sites where an electron donor (food source or substrate for microbes) is present along with the chlorinated solvent contamination. As dissolved oxygen and other electron acceptors become depleted some microbes are capable of using the chlorinated solvents as electron acceptors. For selected compounds such as chlorinated ethylenes sequential dechlorination to a harmless byproduct ethylene can be achieved under favorable environmental conditions (EPA/600/R-98/128 September 1998).

In recent years efforts have been made to produce this anaerobic treatment effect by injection of electron donor into the subsurface. An overview of these technologies can be reviewed in the EPA document Engineered Approaches to In Situ Bioremediation of Chlorinated Solvents: Fundamentals and Field Applications (EPA 542-R-00-008 July 2000). Other inorganic and organic compounds can be degraded or immobilized under anaerobic conditions including selected toxic metals, nitrate, and MTBE. For sites that do not have sufficient amounts of natural electron donors to drive anaerobic natural attenuation, injection of microbial substrates has proven to be a cost-effective treatment or plume migration control measure. The microbial substrates can be injected into the contaminant source area where residual contamination is adsorbed onto soils or injected in a line across a ground water contaminant plume to form a permeable reactive wall to prevent further contaminant migration.

A wide variety of sugars, alcohols, organic acids, and even molecular hydrogen have been used successfully as electron donors to enhance anaerobic biotransformation processes. Most of these compounds are rapidly consumed after injection and must be replaced by either continuous low concentration delivery systems or with frequent batch additions of additive solution. Contaminant source areas can not be effectively removed or even precisely located for many ground water contaminant plumes. The presence of residual chlorinated solvents adsorbed onto soils or present as dense nonaqueous phase product (DNAPL) serves as an example of persistent ground water plume source areas that can last for many decades. These persistent contaminant source areas continue to contaminate ground water for many years such that continuous operation of recirculation systems or frequent substrate injections can be very costly over the life of a project. Long-term injection of substrates into wells or infiltration galleries often leads to severe bacterial fouling problems adding to project operation and maintenance costs.

Recent interest has developed in the use of materials that slowly biodegrade or slowly release organic matter into ground water over time. A commercial product marketed under the brand name of HRC (Hydrogen Release Compound) has been used at many sites to slowly release lactic acid. As described in U.S. Pat. No. 6,420,594 such compounds comprise esters of polylactic acid and polyols. The compound is relatively expensive (approximately $6.00/pound) compared to common low molecular weight substrates such as sugars (approximately $0.30/pound), but is designed to provide a steady supply of lactic acid to ground water for up to a year. Injection of HRC into soil or ground water often results in a limited treatment radius due to the small volume and high viscosity of the injected material. Although the longevity of the product is greatly improved over simple sugars or other low molecular weight substrates reinjection of the product on an annual basis makes this treatment cost prohibitive at many sites.

A variety of sparingly soluble materials also have been explored for their potential to produce a long-term release of electron donors including canola oil, soybean oil, and oleate. A variety of vegetable oils have been demonstrated to be effective electron donors to stimulate anaerobic biodegradation. Although edible oils such as soybean oil have a much lower viscosity than a semisolid product like HRC, distribution in saturated soils is difficult. Soybean oil has a viscosity approximately 80 times higher than water, which results in multiphase fluid flow and potential oil blockage of soil porosity.

The problem of oil viscosity can be greatly reduced by injecting the edible oil as an oil/water emulsion. If the oil droplets are made small enough a dilute but efficacious emulsion has a fluid viscosity that is essentially the same as water. A comparison of the effectiveness of pure soybean oil injection with emulsified oil injection was completed at five Air Force sites, with data clearly indicating that the performance of the emulsified oil is superior.

Injection of pure oil or large droplets of emulsified oil blocks soil pores producing treatment zones that are ineffective because they prevent free flow of ground water through the oil treated area. Injection of pure soybean oil into porous soil media has been shown to reduce water permeability by up to 100%. When oil droplets were reduced to a 6.1-micron median droplet size the soil permeability was still reduced by up to 70% in a quartz sand soil. By reducing the median droplet size of an oil/water emulsion to 2.1 microns the loss of soil permeability from pore clogging was reduced to 25% such that 75% of the original permeability remained after oil/water injection.

Published experimental data suggests that oil/water emulsions in porous media are best described by a filtration model rather than an oil droplet retardation model. Soil column studies confirmed that oil droplets that are trapped within a soil matrix are not easily released, even when the columns are flushed with several pore volumes of clean water. Oil droplets can be retained in porous soil media by two mechanisms straining and interception. In the straining process droplets that are larger than a pore throat physically lodge in the pore throat. In the process of interception droplets contact soil particles and attach to the soil matrix because of electrical charge, Van der Waals forces or other physical mechanisms.

Both mechanisms can act to block a soil matrix pore throat even when oil droplets are smaller than the soil pore throats. As an example a 2.5 micron pore throat may be blocked by 1.0 micron oil droplets if both sides of the pore throat soil particles first attract oil particles by interception, followed by a third particle intercepted by straining in the now reduced pore throat size. As the smaller diameter pore throats become blocked flow is diverted preferentially to larger pore throats within the soil matrix.

It has been stated in the literature that to prevent a large reduction of soil permeability an oil emulsion must have a median oil droplet size to median soil pore throat size ratio of 0.3 or smaller. Unless the emulsified oil injection is conducted on coarse soils it is critical that the median oil droplet size be under 1 micron or substantial loss of soil permeability will result rendering the treatment ineffective. This is especially critical for permeable reactive wall installations where a loss in soil permeability will result in ground water flowing around the reactive wall untreated.

A small droplet size is also beneficial in preventing gravity separation of oil and water from an oil/water emulsion. As predicted by Stokes law an emulsion with smaller droplets will separate more slowly than an emulsion with larger oil droplets proportional to the square of the ratio of the droplet size. An emulsion with oil droplets of one micron will take approximately 100 times longer to separate by gravity than an emulsion containing droplets 10 microns in diameter.

There are several potential methods for preparing an oil/water emulsion for remediation. The simplest method is to use a large amount of surfactant and stir the solution with a low-shear mixer. Emulsions produced in this manner require a large amount of surfactant which greatly increases the risk of mobilizing contaminant free product and produce coarse emulsions with many oil droplets of 20 microns or greater produced.

Emulsions with smaller droplet sizes can often be prepared by adding more physical energy to the emulsion through the use of a high shear mixer. The use of very-high shear mixing equipment such as a dairy homogenizer for field emulsification is difficult because of high equipment capital costs, large size and weight of the equipment, and excessive electrical power requirements.

The use of a portable slotted head high-shear, inline mixer has been suggested for field applications. Although the high-shear slotted head inline mixer appears to be a substantial improvement over low-shear mixing, such field emulsification is time consuming, cumbersome, and does not produce as high a quality emulsion as off-site processing. Multiple passes through the slotted head high-shear, inline mixer produced a median droplet size of approximately 5 microns. As previously described an oil particle size of 5 microns could still cause substantial pore throat blockage and reduced permeability in fine grained soils. For this reason a 5-micron median droplet size was deemed unacceptable for remediation purposes.

It is an object of this invention to provide a method for the long term anaerobic remediation of contaminated soil and ground water using an aqueous emulsion of a sparingly soluble, digestible fat or oil.

It is another object of this invention to provide an aqueous emulsion of a sparingly soluble fat or oil effective for remediation that has a minimal increase in viscosity over water and causes minimal pore blockage in soil.

Still another object of this invention is to provide an aqueous emulsion of a sparingly soluble fat or oil of superior stability and droplet size for long term remediation of contaminated soil and ground water.

Yet another object of this invention is to provide a method for the remediation of contaminated soil that employs more than one anaerobic electron donor and nutrient.

Still another object is to produce remediated soil and ground water in which contaminant levels have been reduced below recognized safety levels.

BRIEF DESCRIPTION OF DRAWINGS

FIGS. 1 and 2 are plan and side elevation schematic drawings illustrating the remediation process of the present invention and FIG. 3 shows the results obtained by using the inventive method in terms of analytical data of contaminants and degradation products of such contaminants.

BRIEF DESCRIPTION OF THE INVENTION

The present invention comprises a method for anaerobic remediation of contaminated soil and groundwater comprising
  a) preparing an aqueous emulsion of a sparingly soluble digestible fat or oil
  b) heating and homogenizing such emulsion until a stable emulsion having a particle size below 1 micron is obtained, and
  c) injecting such under anaerobic conditions into the contaminated soil.

The present invention also comprises an aqueous emulsion useful in anaerobic remediation of a digestible fat or oil having average droplet sizes of less than 0.5 microns and which retain such droplet size for six months or more. The term "digestible" is used as defining a material, substrate that is metabolized as an electron donor by the microbes present or added, for purposes of reducing the contaminants in the soil and ground water through anaerobic reaction. Preferably such oils and fats are also edible oils and fats.

In a further preferred embodiment the heating is carried out at temperatures which cause pasteurization and particularly temperatures of about 170° F. In another preferred embodiment the sparingly soluble fat or oil emulsion is combined with a water-soluble nutrient rapidly utilized by anaerobic microbes. The blend of water soluble, rapidly biodegradable substrate combined with the sparingly soluble, emulsified fat or oil substrate of the present invention provides the optimal combination of rapid microbial growth with a long-term sustained support of the microbial community.

By using the methods of the present invention, it is possible to produce stable oil/water emulsions with particle sizes of less than one micron. In accordance with the present invention selection of effective emulsification additives and multiple pass processing of hot product in a food homogenizer produces an emulsion where 90% of the material is 0.5 microns or smaller. Although it is possible to bring said processing equipment into the field for onsite processing it is expensive and cumbersome. By utilizing fixed-base factory processing facilities, a better quality emulsion may be produced and delivered to the site ready for injection. The prerequisite for such an operation is a stable emulsion as is provided by this invention.

Pasteurization and sterile packing techniques may be used to ensure that the product will be stable for several months allowing the material to be shipped to any location around the world from a given processing facility. Steel drums with plastic bag liners or disposable cardboard totes with bag liners allow for inexpensive and/or disposable packaging materials for containers with 30–300 gallons of product each. In addition pasteurization reduces the presence of competing microbes in the emulsion thus further enhancing the efficacy of pasteurized emulsions in remediation. For example a soybean oil emulsion prepared in accordance with the present invention which had been refrigerated and stored for 295 days maintained the original droplet size of 90% being smaller than 0.5 microns after that period. Even in the absence of refrigeration emulsions prepared in accordance with the present invention retained their original droplet size of less than 0.5 microns for 90% of the emulsion for several months.

Injection of the emulsified oil substrate consists of a proportional feed system that adds the substrate at the precise concentration determined by groundwater analysis. In contrast many practitioners of emulsified oil injection rely on chasing the emulsified oil with clean water in the hope that they will have a relatively uniform dispersion of the additive. Such procedures are not necessary with the emulsions of the present invention.

The propoitional feed system allows continuous injection into multiple injection points as compared to batch additions, which typically involve injection into one temporary well point at a time. Other prior art techniques, (U.S. Pat. No. 6,398,960) also have required pretreatment of the soil with a surfactant solution in order to reduce the blockage of the soil pores by the remediation emulsion. Such is unnecessary in the method of the present invention. The increase in the viscosity and decrease in permeability over water of the emulsion injected into the soil in the present invention is minimal such that the method of the present invention can be employed in all soils that permeate water.

The process of the present invention can be used for the bioremediation of halogenated organic compounds, inorganic compounds that can be biodegraded through anaerobic processes and soluble compounds that can be precipitated and immobilized under anaerobic conditions. Thus halogenated compounds are partially or totally dehalogenated. Oxidized heavy metals and radio nuclides such as chromium, uranium and technetium in high valence states are reduced to less mobile lower valence states. The process of the present invention can further be used in the denitrification of nitrate to nitrogen gas. The method of the present invention can also be used to promote anaerobic biodegradation of perchlorate. Another use is in the methanogenic biotransformation of methyl tert-butyl ether (MTBE).

DETAILED DESCRIPTION OF THE INVENTION AND PREFFERED EMBODIMENTS

Water Soluble, Rapidly Biodegradable Substrate Selection: The substrate preferably consists of a blend of fast and slow release microbial additive compounds. The water soluble fast release additive should consist of approximately 5 or 100% by weight of the total available microbial additive mass including the emulsified fat or oil. A variety of inexpensive easily biodegraded, water soluble compounds may be used including but not limited to lactate, acetate, ethanol, methanol, propylene glycol, sucrose, high fructose corn syrup, and molasses. Food grade materials are preferred since this allows for less regulation in transport and handling, and reduces regulatory concerns over injection of potentially harmful materials in the subsurface. In one application a food grade 60% sodium lactate product was added to the substrate blend to produce a final sodium lactate concentration of approximately 4% by weight.

Selection Of A Sparingly Soluble, Slowly Biodegraded Additive: The sparingly soluble, slow release microbial additive component of the present invention comprises one or more digestible fat or oil. Use of food-grade materials improves regulatory acceptance and streamlines the injection permit process. Oilseed vegetable oil is most commonly selected since these materials are readily available and very inexpensive. At this time soybean oil is the product of choice primarily because of its low cost. If solid fat is preferred for the substrate, hydrogenated soybean oil is typically the least expensive option. Fish oils or animal fats may be used although typically they are more expensive that the oilseed commodities such as soybean oil products. If desired two or more of such fats or oil can be combined in the emulsion.

Selection of the Oil/Fat Content of the Additive: Stable emulsions can be prepared ranging from 25% oil to 60% oil by weight in water. The viscosity of the emulsified product increases dramatically as the oil or fat content exceeds 50% by weight. At higher oil/fat contents of 65% by weight or greater, maintaining a stable emulsion becomes much more difficult, and problems with short shelf life due to creaming out of the oil/fat are likely. A substrate containing 45% fat or oil by weight provides a relatively high oil content, with a relatively low viscosity and good emulsion stability and is therefore preferred in the present invention for transportation and storage. However in actual use for remediation the concentration of the emulsion is reduced to levels of 1 to 10%, which decreases the viscosity and further increases the stability without affecting the ability to remediate the soil. Examples of sparingly soluble oils used in the process of the present invention are soybean oil, corn oil, olive oil, canola oil, coconut oil, rape oil, and fish oil.

Selection of an Emulsification Additive or Food Additive Blend: A large number of emulsifying agents useful in the present invention are known to those in the skilled in the art and have been published in the literature. The affinity of an emulsification agent for water vs. oil is defined by its hydrophilic/lipophilic balance (HLB). Vegetable oils such as soybean oil are relatively easy to emulsify in water and a wide range of emulsification agents may be used with HLB values ranging from 8 to 15. Too low an HLB may result in production of a water/oil emulsion rather than an oil/water emulsion. Too high an HLB may result in problems with foaming.

Surfactants with differing HLB values may be blended to produce an additive average such that a blend of 50% by weight of a material with an HLB of S with 50% by weight of a material that has an HLB of 12 will produce a blend with an HLB of 10. Common food grade emulsifiers include lecithin, mono and diglycerides, mono and diglyceride ethoxylates, "Tweens" (polysorbates, a.k.a. polyoxyethylene sorbitan esters), "Spans" (sorbitan esters), and glycerol esters. In addition at least one of the selected emulsifying agents must be able to function at the temperatures required for pasteurization and formation of very small particles.

The amount of emulsification agent can vary from 0.25% to 10% of the oil/fat content by weight. The homogenization process of the present invention allows for the use of much smaller amounts of emulsifying agent due to the high energy processing. Some excess of emulsifying agent may be desirable to make the emulsion hold up longer under microbial attack after injection. Since it is desirable for the emulsion to eventually break in the subsurface biodegradable emulsifying agents should be selected.

In one field application a blend of three emulsification agents, consisting primarily of polysorbate 60 and a modified lecithin with lesser amounts of mono and diglyceride ethoxylates was selected. The modified lecithin was selected since it was available in a commercial soybean oil blend along with the mono and diglyceride ethoxylates and polyethylene glycol. This allowed for easy mixing of the soybean oil in water prior to processing. The polysorbate 60 is a gel or semisolid at room temperature making it more difficult to work with. By steam heating or setting drums of the material in a hot box it is relatively easy to use in a factory setting, field use of polysorbates would be challenging.

Polysorbate 60 was selected as the primary emulsification agent because it has good resistance to high temperatures and is active under a wide range of pH values and dissolved mineral concentrations. The final blend consisted of about 7% emulsification agents by weight with 2% being polysorbate 60, the majority of the remaining emulsifying agents consist of a modified lecithin and lesser amounts of mono and diglyceride ethoxylates and polyethylene glycol acting as a co-solvent.

The exact amounts of the lecithin, mono and diglyceride ethoxylates, and propylene glycol are not known as they are part of a proprietary blend produced by Central Soya, Inc., sold under the product name of Centromix BR. Subsequent pilot test runs have reduced the emulsifying agent content from 7% to less than 3.5% without any detrimental effects. Based on food industry experience the amount of emulsification agent content could be reduced to as little as 0.25% without changing the nature of the emulsion.

Physical Processing of the Additive: For a fill scale emulsified oil production run a total of 52,000 pounds of material was prepared. The water, salad grade soybean oil, Centromix BR, Polysorbate 60, and sodium lactate were blended first with a low shear mixer at 120° F. The hot material was then processed at 150° F. by running it twice through a two-stage dairy homogenizer with the first stage pressure set at 2000 psig and the second stage set at 500 psig. After homogenization the material was pasteurized in a HTST heat exchanger at 170° F. for 30 seconds. Immediately after the HTST pasteurizer the product was chilled to 40 degrees and packaged in 1000 liter-disposable totes. Suitable homogenizers include food homogenizers and are commercially available from APV Homogenizers AS and are sold as Gaulin and Rannie homogenizers.

A single stage homogenizer set at 1,800 psig or a two-stage homogenizer set at 2,000 psig for the first stage and 500 psig for the second stage appear to produce a comparable product. In general high pressures used in the homogenization can range from 1500 to 3000 psig. Product quality is expected to improve with increasing temperatures, but care must be taken to prevent heat damage to the formulation components. Two passes through the homogenizer greatly improves the quality of the homogenized product. Additional passes through the homogenizer may produce small incremental reductions in droplet size with the slight improvement in quality becoming insignificant after four or five passes through the homogenizer. Although a dairy homogenizer produces very high shear mixing and high quality emulsions, in some cases other industrial or food processing equipment such as a colloid mill could be used to produce similar results. It should be appreciated that the desired emulsion can be obtained at temperatures as low as 100° F. by increasing the number of homogenizing steps. Temperatures above 200° F. are undesirable and lead to lower stability emulsions.

Field Application—Additive injection: The emulsions of the present invention are used in accordance with methods that have been established in the art. Such methods require in addition to having a large enough additive mass to support the anaerobic microbes needed to complete the microbial transformation of contaminants, a sufficient electron donor (additive) added to remove existing supplies of electron acceptors. The presence of natural electron acceptors in ground water such as dissolved oxygen, nitrates, and sulfates will consume the organic components of the substrate (an electron donor), such that a larger mass of emulsion, must be applied if high concentrations of these compounds are present. Since the targeted contaminants may be adsorbed onto soil particles or present as nonaqueous phase liquid (NAPL), they may be slowly released in ground water over a period of years. For this reason the residual edible oil additive may need to persist for several years to provide treatment for as long as the residual contaminants are present. Additional substrate will be required even at sites with low contaminant concentrations to allow the residual oil in the substrate to persist in the treatment zone for the desired treatment interval between injections. It is presumed that a larger mass of injected oil/water emulsion will persist longer than a smaller mass. However doubling the injected substrate mass, will not necessarily double the time the oil/water treatment remains effective and the relationship between substrate mass and the longevity of an effective treatment zone remains to be determined in future field trials. The goal of emulsified oil injection is to produce an anaerobic treatment zone that remains effective for several years. Since edible oil injections have only been completed in recent years and the treatment is anticipated to be effective for several years detailed information on the relationship of the injected oil mass to treatment zone longevity will only become available after many years of field trials.

Figure 1:
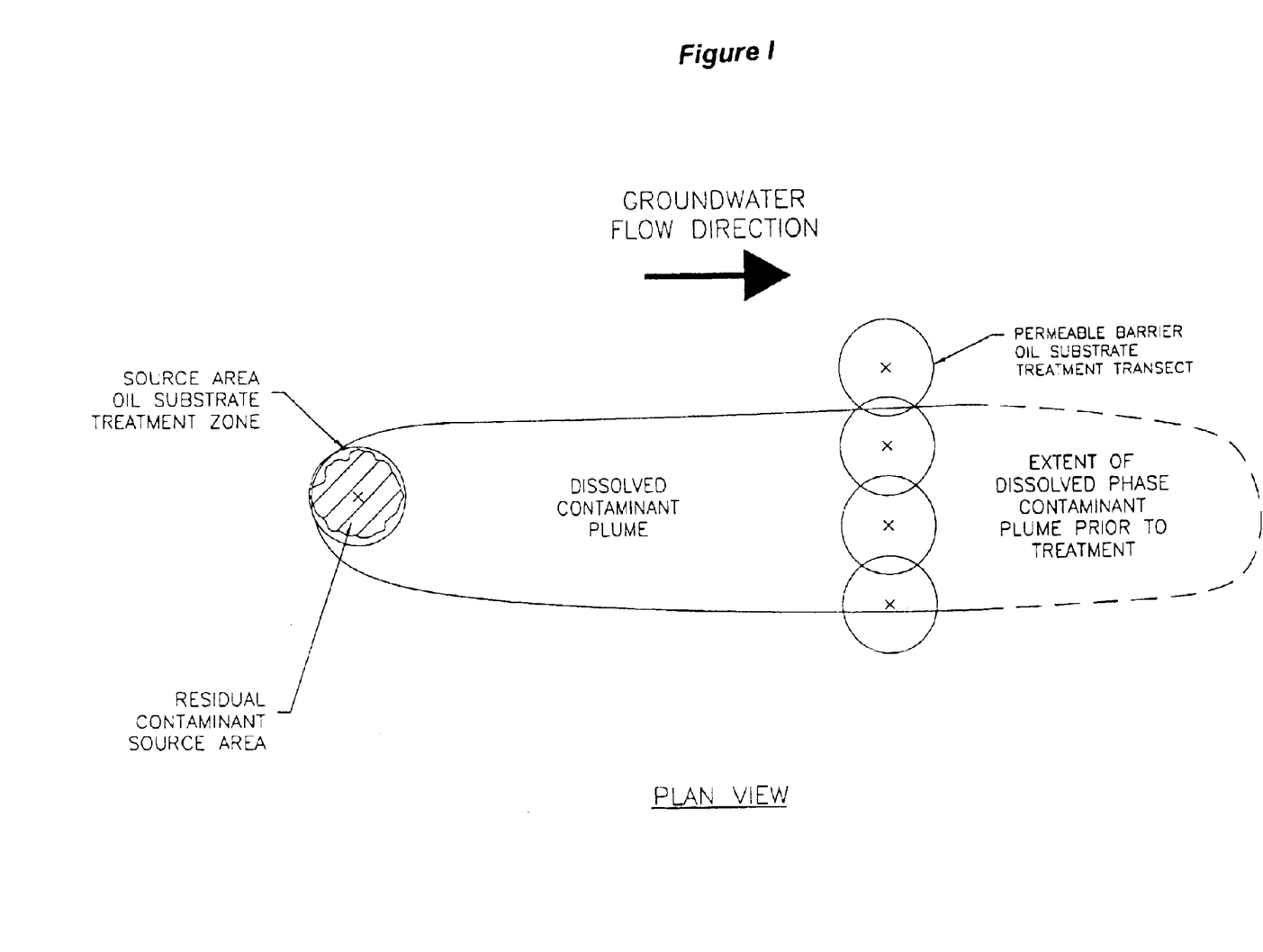
Figure 2:
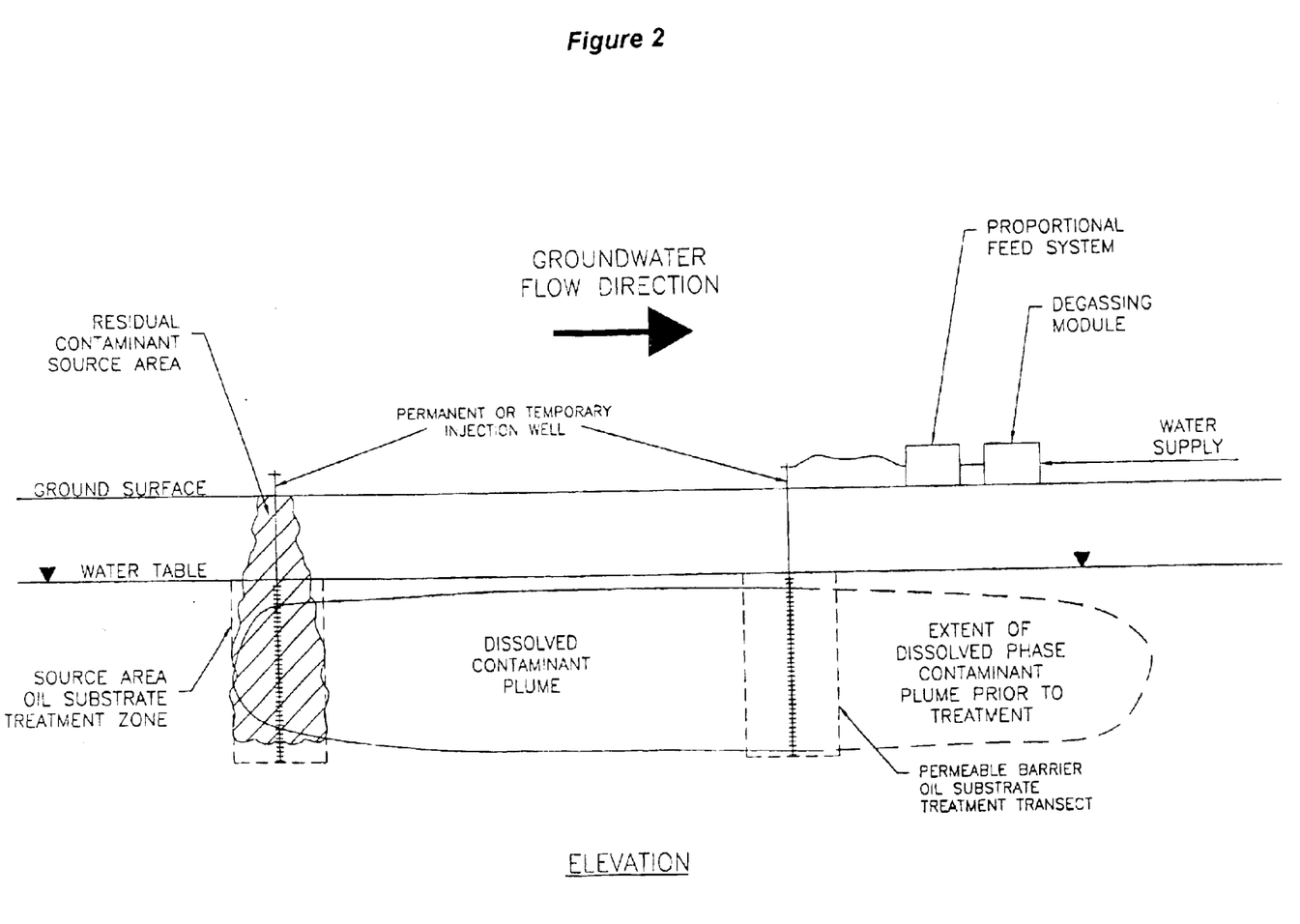

The goal of the emulsified oil injection is to leave a film or network of tiny oil droplets distributed in the soil matrix where they will slowly release food to support microbial activity without blocking soil pores with residual oil. Even with a very small oil droplet size, interception of droplets and adsorption of oil droplets onto soils will occur. Since oil is lost from the injection fluid by adsorption onto soil particles, the oil/water emulsion needs to have a high enough oil content to transport oil outward from the injection well and produce an adequate treatment radius. Typical emulsified oil concentrations in injection water range from 0.5% to 5% oil by weight. The oil/water additive can be injected directly into the source area and/or injected in a transect across a dissolved phase ground water plume (see FIGS. 1 and 2). As illustrated in the drawings of a preferred way, a permeable barrier of substrate across the plume of the groundwater flowing from the source of the contamination is created by repeated injections of the substrate at permanent or temporary well points drilled across the plume at distances such that the spreading emulsion will overlap to a certain degree. Sufficient substrate is injected such that not only some of it is retained in the area of the barrier but also that some of it will flow with the plume and thereby continue to further reduce the contaminant concentration in the water by anaerobic reaction to the extent that such has not been substantially eliminated in the barrier. in the alternative or in addition it is further preferred to inject the substrate through permanent or temporary well points directly drilled into the contaminated area.

Other practitioners of anaerobic substrate remediation have described on-site processing and batch additions of such substrates into temporary monitoring wells. This approach to substrate processing and injection has several disadvantages. It is slow and cumbersome since only a limited volume can be prepared and stored at a give time. If the substrate is to be injected at its final dilute concentration of 0.5% to 5% oil it must be stored in very large tanks on site, typically allowing only one injection to proceed at a time. If instead the concentrated substrate is injected in a batch addition and followed by a clean water injection, as has been described in the literature, the risk of poor substrate distribution in the subsurface is greatly increased.

Processing oil emulsions on site may be limited by the type of equipment that can be used, by available electrical power supply and in the selection of suitable additive ingredients for field handling. These limitations often lead to emulsions that have larger oil or fat droplet sizes with median droplet size ranging from 2–20 microns. By processing the material off-site with optimal equipment, ingredients, temperature and pressure conditions it is possible to consistently produce a high quality emulsion with a median droplet size of less than 0.5 microns.

On site processing and storage in open vessels exposed to the atmosphere introduces dissolved oxygen (an electron acceptor) into the substrate and injection water. Dissolved oxygen not only consumes additive, but it is highly toxic to many of the indigenous anaerobic microbes, which are critical to establishing an effective anaerobic treatment zone. This issue is especially critical when bioaugmentation with cultures such as the GE Pinellas culture or KB1 are used for reductive dechlorination of chloroethylenes. These cultures contain obligate anaerobes that are rapidly killed in the presence of dissolved oxygen.

In a preferred embodiment of the present invention a degassing module such as a vacuum degassing module for the removal of dissolved oxygen from the injection water is employed. Removal efficiency is variable depending on flow rate, water temperature, and the initial dissolved oxygen concentrations. Typical removal is 90–95% of the initial dissolved oxygen with residual dissolved oxygen concentrations ranging from 0.1–0.25 mg/L. The additive is stripped of most of its dissolved oxygen during high temperature processing, with any remaining dissolved oxygen removed during shipment and storage by natural oxidation processes. The combination of injection of an oxygen free additive with reduced oxygen injection water ensures minimal impact to anaerobic microbes whether indigenous microbes are used for treatment or an added culture such as KB1.

Use of a proportional additive feed system allows for continuous injection of multiple wells. The proportional feed pump is driven by the water supply pressure, with a piston apparatus that adds a preset percentage of additive solution 1–10% of the water flow regardless of increasing or decreasing flow rates. The complete substrate of the present invention typically contains 45% oil by weight such that addition to water at 1–10% by volume produces a working oil addition range of 0.45% to 4.5% oil by weight in the injected fluid. Having the substrate prepared offsite allows additive injection to proceed quickly with the ability of the injection points to accept water being the primary limiting factor.

In one test a proportional feed system was designed to simultaneously inject the inventive oil emulsion prepared off site into 1 to 10 wells. The system permits the oil/water additive to be injected at different flow rates for ten wells simultaneously, with individual points taken on and off-line as they reach the desired injection volume without interrupting the additive delivery to the other well points. Each individual injection line is equipped with flow meters that display the total volume of fluid injected to ensure an accurate injection volume is delivered to each well point. The proportional feed system is self-priming with a 20-foot suction lift allowing 1000-liter totes to be put on-line quickly without interrupting additive and water flow into the ten injection wells. The intake hose is simply dropped into the next open additive tote and the empty tote is collapsed and disposed of or recycled.

With this fast efficient injection process a large number of wells can be treated in a few days. Thus one field application of this method the substrate was injected into a silty fine sand through 97 injection points. In spite of being limited to injection flow rates of 1 gpm or less per well a total of 70,000 gallons of the inventive oil emulsion and water was injected in three weeks (daytime injection only 10–12 hours). Using batch processing and the sequential injection of lecithin/water, oil/water, water, and lecithin/water, as described by other practitioners would have taken months at this site, greatly increasing the project cost.

It may be also desirable to add a tracer to the substrate to be injected which can either be water soluble or oil soluble and provides a means of determining the degree of penetration of the substrate into the soil and ground water being treated. In one embodiment the emulsion is pasteurized and aseptically packaged to provide for a longer oil/water shelf life. In another embodiment the solution or substrate is formed at a concentration of 25 to 65% and is diluted on site to a concentration of 1 to 10 and metered into a continuous injection stream with a proportional feed system.

FIELD APPLICATION OF THE TECHNOLOGY

In a fill scale application of the invention, the target contaminants consisted of trichloroethane (TCE), trichloroethane (TCA) and their degradation products dichloroethene (DCE) and Vinyl Chloride (VC). The contaminant source area is concentrated under a concrete pad that had supported solvent above ground storage tanks (ASTs). Soil in the surficial aquifer consists of a fine to medium sand with some silt to a depth of approximately 20 feet. At a depth of 20 to 22 feet below ground surface there is a clay aquitard which has prevented contamination from entering the deeper aquifer. The aquifer below the aquitard is artesian with a piezometric head approximately 5 feet higher than the surficial aquifer. Depth to ground water in the contaminated surficial unit ranges from 2–4 feet below ground surface. The ground water flow direction is variable due to tidal influence, but the overall ground water flow direction towards the sea.

Natural attenuation sampling indicated conditions favorable to reductive dechlorination in most of the source area and in the down gradient dissolved phase plume. Despite such conditions of TCE and TCA remained above 10,000 parts per billion (ppb) in the most contaminated source area wells, MW-12 and MW-6. Although the plume appeared to be contained by natural attenuation processes, active treatment of the area was requested because of concerns over the persistent high concentrations of TCE and TCA in the source area wells.

Anaerobic bioremediation was selected because it would compliment the natural processes already active at the site. Injection of an emulsified oil additive was selected to allow for a single additive injection that would be active for several years. Recirculation of lactate or other rapidly biodegraded additives was considered but with the relatively low soil permeability, well fouling and low injection and extraction rates were anticipated as operational problems. Also the site is currently in use as a steel storage yard and buildings, above ground injection well piping or storage tanks would interfere with site operations. The substrate employed was prepared by mixing in a low shear mixer at about 120° F. water, salad grade soybean oil, and commercially available soybean oil surfactant blend product "Centromix B", which contained about 5% of modified lecithin with minor amounts of mono- and diglyceride ethoxylates and propylene glycol in a ratio of 65 parts of water to 45parts of oil, and about 4% of a rapidly biodegradable substrate comprising sodium lactate. To this was added about 2% of polysorbate 60 as an additional emulsifying agent. The resulting material was then heated to 150° F. and run twice through a two-stage homogenizer set at 2000 and 500 psig respectively. The resulting emulsion was then passed through HTST pasteurizer at about 170° F. for about 30 seconds. Immediately after pasteurization, the emulsion was chilled to 40° F. and packaged in 1000-liter totes. The median droplet size was 0.28 microns with 90% of the oil consisting of droplets smaller than 0.42 microns. The lactate was used in part to promote rapid reduction of dissolved oxygen to thereby produce a strongly reducing environment.

Tests with the lactate and emulsified oil formulation showed that within 48 hours dissolved oxygen levels were dramatically reduced in the soil to be remediated and the oxidation reduction potential (ORP) became strongly negative (−229 and −169.8 mV) indicating suitable conditions for an anaerobic treatment zone.

The sodium lactate was also added to protect the biodegradable emulsifying agents by providing microbes with a preferred substrate, which would prevent consumption of the emulsification agent until the lactate had been consumed. This strategy appears to have worked since material has remained stable for up to two months without refrigeration, and refrigerated samples show no signs of oil/water separation for periods of up to a year.

The addition of the lactate was also used to prevent rapid breakdown of the emulsion in the subsurface.

With a total aquifer depth of 20 feet and a depth to water of only two feet, soil borings and installation of temporary injection wells was very inexpensive. To provide a detailed map of the distribution of residual TCE and TCA contamination in the source area soils and to map the elevation of the surface of the clay aquitard 160 geoprobe soil borings spaced on five-foot centers were completed. Temporary injection wells were installed by placing a two-inch PVC well casing in the open borehole formed from driving a large diameter geoprobe push rod and letting the soils collapse (no filter pack added). At 97 of these locations temporary injection well screens and casings were installed for the injection of the emulsified oil and sodium lactate additive. The injection wells consisted of an arc of 22 wells acting as permeable reactive barrier (FIG. 1) to prevent dissolved contaminant migration, and the remaining 75 injection points were located in the source area where TCE and TCA residual soil contamination had been detected. The substrate was injected under pressures ranging from 5 to 10 psig at the well head. Higher pressures resulted in too much mounding of the water table with amendment rising above ground surface because of the shallow depth to ground water.

A full-scale injection of 70,000 gallons of injection water containing approximately 4% by volume of described emulsified oil was completed. Because of the silty sand soil, wells on average could only accept 1 gallon per minute (gpm) at an injection pressure of 5–7 psig with injection rates ranging from 0.25 gpm to 3.0 gpm in individual wells.

The test equipment was designed to allow for precise metering of the concentrated additive (50% soybean oil by volume) into ten wells simultaneously. Each of the 97 injection wells received 700–750 gallons of injectate over a period of three weeks.

Due to the relatively low permeability of the silty soil many small soil pore throats are present at the site that could easily have been clogged by large oil droplets. Injection of the 1-micron or smaller (90% a of the oil droplets smaller than 0.42 micron) additive proved effective with no sign of separate phase oil and no indication of the injectate flow and distribution differing from injection of pure water. Emulsified oil was detected at a distance of 2.5 to 3 feet from each point as predicted by the injection volume of 700 gallons per well. A much larger treatment radius would have been possible, but with a depth to water of only 2 feet the cost of drilling temporary injection wells was not a major factor in the total project cost.

Samples were collected from the source area wells monthly after the injection for first six months before returning to a quarterly sampling schedule. A summary of groundwater analyses from some of the wells after the first five months following the additive injection is presented in Table 1. A dramatic drop in contaminant levels for all volatile organic compounds (VOCs) is sometimes observed in initial oil injections, but such is due to the oil blocking soil pore throats, and partitioning of the VOCs into the vegetable oil. This was not observed in the treatment area. In contrast the most heavily contaminated well, MW-12, saw a 10-fold increase in VOC concentrations likely due to physical displacement and release of residual product by the emulsification agents. After the initial jump in concentration the levels of TCA and TCE have decreased and an increase in the TCE daughter products cis 1,2 DCE. Further dechlorination of cis 1,2 DCE is indicated by an increase in vinyl chloride in MW-12.

In another source area well, MW-6, concentrations of TCE declined from 64,000 ppb to nondetectable concentrations in the first five months after treatment. Increases in the daughter product of TCE, cis-1,2-DCE, from 4,100 ppb to 17,000 ppb were observed but declining at the end of the first five months after treatment indicating the further decomposition of cis-1,2-DCE. Vinyl Chloride derived from the decomposition of the 1,2-DCE increased from nondetectable concentrations to 8900 ppb showing the further reduction of the halogenated contaminant. The well MW-7, which was located at the edge of the source area, represents dissolved contamination with little or no residual soil contamination. Initial concentrations for total chlorinated VOCs in MW-7 were about 2,000 ppb and four months after the additive injection total VOCs had been reduced to below the detection limit.

Analysis of the groundwater for ethane and ethene demonstrated that complete reductive dechlorination occurred, and that cis 1,2 DCE and vinyl chloride are unlikely to persist in soil and ground water. In MW-21 a clean well upgradient of the treatment area background concentrations of ethane and ethane were measured at 18 ng/L ethane and 18 ng/L ethene. Within the contaminated oil injection area ethane levels of 470 ng/L, 410 ng/L, and 1,400 ng/L were measured for MW-6, MW-7 and MW-12 respectively, six months after injection of the emulsified oil substrate. Ethene levels for these wells were measured at 460,000 ng/L, 75,000 ng/L, and 430,000 ng/L respectively for MW-6, MW-7 and MW-12, six months after emulsified oil injection. The greatly elevated ethene concentrations provide strong evidence that vinyl chloride is being dechlorinated to ethane within the emulsified oil treatment area.

anaerobic environment at the site for a long period of time. Other data showing that the emulsion injection has produced a more anaerobic environment include decreases in sulfate, nitrate, dissolved oxygen, and ORP, along with increases in the reduction products including soluble iron, soluble manganese, and methane.

What is claimed is:

1. A method for removing contaminants from soil and ground water using anaerobic biostimulation to produce an anaerobic treatment zone that enhances biotransformation or immobilization of the target contaminants, consisting of essentially the following steps:

TABLE 1

9.4% Substrate Injected - 4.3% Soybean Oil By Weight

| Date Sampled | Elapsed Time Since Injection Days | 1,1,1 Trichloroethane, ppb | Trichloroethane, ppb | 1,1 Dichloroethane, ppb | cis 1,2 Dichloroethane, ppb | Vinyl Chloride ppb |
|---|---|---|---|---|---|---|
| MW-6 | | | | | | |
| Dec. 21, 2002 | Preinjection | <2,500 | 64,000 | 3,400 | 4,100 | <2,500 |
| Mar. 29, 2002 | 2 | <1,000 | 60,000 | 2,700 | 8,200 | <1,000 |
| Apr. 30, 2002 | 34 | 430 | 13,000 | 1,700 | 17,000 | 6,200 |
| May 24, 2002 | 58 | 300 | 2,900 | 950 | 7,600 | 4,800 |
| Jun. 14, 2002 | 72 | <250 | 4,000 | 1,000 | 11,000 | 8,900 |
| Jul. 23, 2002 | 111 | <250 | 2,000 | 490 | 7,800 | 6,800 |
| Aug. 22, 2002 | 141 | <250 | <250 | <250 | 3,400 | 7,300 |
| Sep. 18, 2002 | 168 | <100 | <100 | <100 | 2,800 | 460 |
| Dec. 17, 2002 | 258 | 54 | <50 | <50 | 1,400 | 3,200 |
| MW-7 | | | | | | |
| Dec. 21, 2002 | Preinjection | <25 | 200 | 58 | 920 | 670 |
| Mar. 29, 2002 | 2 | <25 | 410 | 120 | 1,900 | 540 |
| Apr. 30, 2002 | 34 | <10 | <10 | <10 | 470 | 650 |
| May 24, 2002 | 58 | <2.5 | <2.5 | <2.5 | 73 | 160 |
| Jun. 14, 2002 | 72 | <2.5 | <2.5 | <2.5 | <2.5 | <2.5 |
| Jul. 23, 2002 | 111 | <1 | <1 | <1 | 6 | 63 |
| Aug. 22, 2002 | 141 | <1 | <1 | <1 | 4 | 36 |
| Sep. 18, 2002 | 168 | <100 | <100 | <100 | 2,800 | 460 |
| Dec. 17, 2002 | 258 | <1 | <1 | <1 | 7 | 8 |
| MW-12 | | | | | | |
| Dec. 21, 2002 | Preinjection | 16,000 | 29,000 | 4,100 | 2,000 | 250 |
| Mar. 29, 2002 | 2 | 150000 | 250,000 | 45,000 | <2,500 | <2,500 |
| Apr. 30, 2002 | 34 | 130,000 | 230,000 | 30,000 | 8,200 | <2,500 |
| May 24, 2002 | 58 | 90,000 | 100,000 | 15,000 | 15,000 | <5,000 |
| Jun. 14, 2002 | 72 | 82,000 | 140,000 | 8,800 | 10,000 | <5,000 |
| Jul. 23, 2002 | 111 | 34,000 | 35,000 | 11,000 | 16,000 | 3,400 |
| Aug. 22, 2002 | 141 | 18,000 | 18,000 | 7,400 | 14,000 | 7,000 |
| Sep. 18, 2002 | 168 | 20,000 | 27,000 | 5,900 | 17,000 | 4,100 |
| Dec. 17, 2002 | 258 | 7,100 | 6,100 | 3,200 | 9,500 | 6,500 |

The anaerobic biodegradation results can not be attributed to just the sodium lactate content of the injected substrate. The sodium lactate although added at an initial concentration of approximately 4,000 mg/L was expected to be completely depleted within the first month. After the first month the fermentation of the soybean oil into volatile fatty acids (VFAs) sustains the anaerobic bioremediation. Six months after substrate injection, ground water from three wells within the injection area was analyzed for volatile fatty acids including lactate/lactic acid were analyzed. Lactic acid (36 mg/L) was detected only in one of the wells (MW-6). In contrast other VFAs such as acetic, propionic and butyric acid were detected in all three wells. Total VFA concentrations of 332, 610 and 221 mg/L were detected in ground water from MW-6, MW-7 and MW-12 respectively. The primary VFA fermentation product appears to be acetic acid followed by propionic acid and butyric acid in descending order of concentration. WA production from soybean oil fermentation has been shown to be sufficient to produce an a) blending water with digestible oil or fat and an emulsifier having an HLB of 8 to 15 to form an emulsion, b) homogenizing said emulsion at temperatures of 100 to 200° F. and pressures of 1500 to 3000 psig until a stable emulsion having a median droplet size below 0.5 microns is obtained, c) pasteurizing the homogenized emulsion thereby forming a substrate suitable for bioremediation, and d) injecting said substrate into contaminated soil and ground water.

2. The method of claim 1 wherein one or mere water soluble, rapidly biodegradable microbial food compound is added to the substrate prior to injection.

3. The method of claim 1 wherein the contaminants are chlorinated hydrocarbons.

4. The method of claim 1 wherein the anaerobic biostimulation is used to immobilize metal contaminants to prevent their migration in ground water.

5. The method of claim 1 wherein the anaerobic biostimulation is used to promote removal of the contaminant nitrate by denitrification processes where said contaminant is reduced to nitrogen gas.

6. The method of claim 1 wherein the anaerobic biostimulation is used to promote anaerobic biodegradation of perchlorate.

7. The method of claim 1 wherein the anaerobic biostimulation is used to result in the methanogenic biotransformation of methyl tert-butyl ether (MTBE).

8. The method of claim 1 wherein the anaerobic biostimulation is used in the reductive dechlorination of perchloroethylene (PCE) to trichloroethylene (TCE), of TCE to dichloroethylene (DCE), of DCE to vinyl chloride (VC), and of VC to ethene.

9. The method of claim 1 wherein anaerobic microbes are added to the substrate before injection.

10. The method of claim 1 where the substrate is prepared off-site.

11. The method of claim 1 wherein the emulsifier is food grade and is at a concentration of less than 10% by weight of the digestible oil or fat.

12. The method of claim 2 wherein the water soluble, rapidly biodegradable microbial food compound includes an organic acid, a carbohydrate, an alcohol, or an acetate.

13. The method of claim 1 wherein the substrate is injected into the soil at a concentration of 1 to 10%.

14. The method of claim 1 wherein homogenizing is in a food homogenizer.

15. The method of claim 1 wherein after pasteurization the substrate is aseptically packaged.

16. The method of claim 1 wherein the substrate is formed at a concentration of 25 to 65% off site and is diluted on site to a concentration of 1 to 10.

17. The method of claim 16 wherein in step d) the substrate is metered into a continuous injection stream with a proportional feed system, and the injection stream is injected into the contaminated soil and ground water.

18. The method of claim 1 wherein in step d) injection dilution water is pretreated with an oxygen degassing system, and the dilution water is injected to dilute the substrate.

19. The method of claim 1 wherein aqueous conservative tracers are used to track the movement of the substrate injected in step d).

20. The method of claim of claim 1 wherein the digestible oil is soybean oil, peanut oil, corn oil, olive oil, canola oil, coconut oil, rape oil, or fish oil.

21. The method of claim 2 wherein the microbial food compound comprises a lactate.

22. A method for removing contaminants from soil and ground water using biostimulation to produce an anaerobic treatment zone that enhances biotransformation or immobilization of the target contaminants, consisting of essentially the following steps:

a) blending water with soybean oil, an emulsifier having an HLB of 8 to 15 and sodium lactate to form an emulsion, b) homogenizing said emulsion at temperatures of 100 to 200° F. and pressures of 1500 to 3000 psig until a stable emulsion having a median droplet size below 0.5 microns is obtained, c) pasteurizing the homogenized emulsion thereby forming a substrate suitable for bioremediation, and d) injecting said substrate into contaminated soil and ground water at a concentration of soybean oil to ground water of from 0.5 to 5% by weight.

* * * * *